(12) United States Patent
Kurachi et al.

(10) Patent No.: US 6,975,045 B2
(45) Date of Patent: Dec. 13, 2005

(54) WIND POWER GENERATING SYSTEM

(75) Inventors: Harukichi Kurachi, Osaka (JP); Satoru Aritaka, Chiba (JP); Motoharu Konse, Hokkaido (JP)

(73) Assignee: MAG Power Japan Kabushiki Kaisha, Tokyo (JP)

( * ) Notice: Subject to any disclaimer, the term of this patent is extended or adjusted under 35 U.S.C. 154(b) by 151 days.

(21) Appl. No.: 10/791,407

(22) Filed: Mar. 2, 2004

(65) Prior Publication Data

US 2005/0194790 A1 Sep. 8, 2005

(51) Int. Cl.$^7$ ............................................... F03D 9/00
(52) U.S. Cl. ........................ 290/44; 290/55; 310/112
(58) Field of Search .......................... 290/43, 44, 54, 290/55; 310/112, 116

(56) References Cited

U.S. PATENT DOCUMENTS

| | | | | |
|---|---|---|---|---|
| 4,061,926 A | * | 12/1977 | Peed | 290/55 |
| 4,291,235 A | * | 9/1981 | Bergey et al. | 290/55 |
| 4,785,213 A | * | 11/1988 | Satake | 310/116 |
| 4,945,296 A | * | 7/1990 | Satake | 318/538 |
| 5,506,453 A | * | 4/1996 | McCombs | 290/44 |
| 5,844,341 A | * | 12/1998 | Spooner et al. | 310/112 |
| 6,172,429 B1 | * | 1/2001 | Russell | 290/54 |
| 6,278,197 B1 | * | 8/2001 | Appa | 290/55 |
| 6,326,713 B1 | * | 12/2001 | Judson | 310/112 |
| 6,452,287 B1 | * | 9/2002 | Looker | 290/55 |

\* cited by examiner

*Primary Examiner*—Nicholas Ponomarenko
(74) *Attorney, Agent, or Firm*—Marshall & Melhorn, LLC

(57) ABSTRACT

In a wind power generating system, a pair of axially spaced turbines are connected to an outer rotor and an inner rotor of a generator, respectively, and are provided with blades having equal but opposite pitch angles so that the inner and outer rotor rotate at a same rotational speed in opposite directions. Because the relative rotational speed between the inner and outer rotors is twice as great as the rotational speed of the inner rotor or outer rotor, the generator system can produce a relatively large electric power even when the wind speed is low. If desired, a pitch varying mechanism for the turbine blades may be done away with so as to reduce the manufacturing and maintenance costs.

7 Claims, 4 Drawing Sheets

WIND POWER GENERATING SYSTEM

TECHNICAL FIELD

The present invention relates to a wind power generating system, and in particular to a wind power generating system that can produce a relatively large amount of electricity even when the wind speed is low.

BACKGROUND OF THE INVENTION

Various advantages of the wind power generating system are widely known but it is also known that there are some disadvantages that prevent more wide spread use of wind power energy. One of the disadvantages is that the power output fluctuates a great deal because the wind speed is not constant and largely unpredictable. There are areas where wind blows more or less constantly. However, a larger majority of areas experience wind of highly fluctuating wind speeds. In spite of extensive research efforts, conventional wind power generating systems are not able to produce a useful amount of electric energy when the wind speed drops below a certain level. In most cases, a useful amount of electricity may not be produced during a large part of each day.

BRIEF SUMMARY OF THE INVENTION

In view of such problems of the prior art, a primary object of the present invention is to provide a wind power generating system that can produce a relatively large amount of electric energy even when the wind speed is low.

A second object of the present invention is to provide a wind power generating system that can operate over a relatively wide range of wind speed, and can be manufactured at low cost.

According to the present invention, these and other objects of the present invention can be accomplished by providing a wind power generating system, comprising: A wind power generating system, comprising: a generator housing mounted on a fixed base so as to be rotatable around a vertical axis; an outer rotor including a hollow cylindrical member supported by the generator housing so as to be rotatable around a horizontal axis and a plurality of permanent magnets attached to an inner circumferential surface of the cylindrical member at a regular angular interval, the cylindrical member including a coaxial extension having a reduced diameter; an inner rotor including a shaft disposed coaxially with the cylindrical member in a freely rotatable manner, a plurality of core teeth arranged circumferentially along an outer circumferential surface of the shaft, and a coil wound around each core tooth, the shaft including a free end that coaxally extends out of the coaxial extension of the cylindrical member; a slip ring arrangement for electrically connecting the coils of the inner rotor to an external circuit; a first turbine including a plurality of turbine blades mounted to the free end of the shaft of the inner rotor; a second turbine including a plurality of turbine blades mounted on the coaxial extension of the cylindrical member, the turbine blades of the second turbine being provided with a pitch angle that is opposite in sense from those of the first turbine but otherwise similar in shape as those of the first turbine; wherein the first turbine is axially spaced from the second turbine at least by three times or more preferably five times the axial width of the turbine blades.

It was also found that the spacing between the first and second turbines should be at least 10% of the outer diameter of the turbines in order to ensure a favorable efficiency.

Because the relative rotational speed between the inner and outer rotors is twice as great as the rotational speed of the inner rotor or outer rotor, the generator system can produce a relatively large electric power even when the wind speed is low. To further advance such an advantage, it is preferable to provide as large a number of permanent magnets as possible. Preferably, the number of the permanent magnets is n times the number of the core teeth, n being an integer equal to two or greater.

Because the generator is provided with the inner and outer rotors both of which rotate with respect to the generator housing, the slip ring arrangement should be provided between an end of the shaft of the inner rotor remote from the free end thereof extending out of the cylindrical member of the outer rotor and an opposing part of the generator housing.

In view of minimizing the manufacturing cost, the turbine blades of the first and second turbines may be each provided with a fixed pitch angle.

For practical purposes, the electric output should be obtained as three-phase AC power. To this end, the inner rotor may include three sets of core teeth that are arranged along an axial direction while the outer rotor includes three sets of permanent magnets arranged along an axial direction so as to correspond with the three sets of core teeth.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
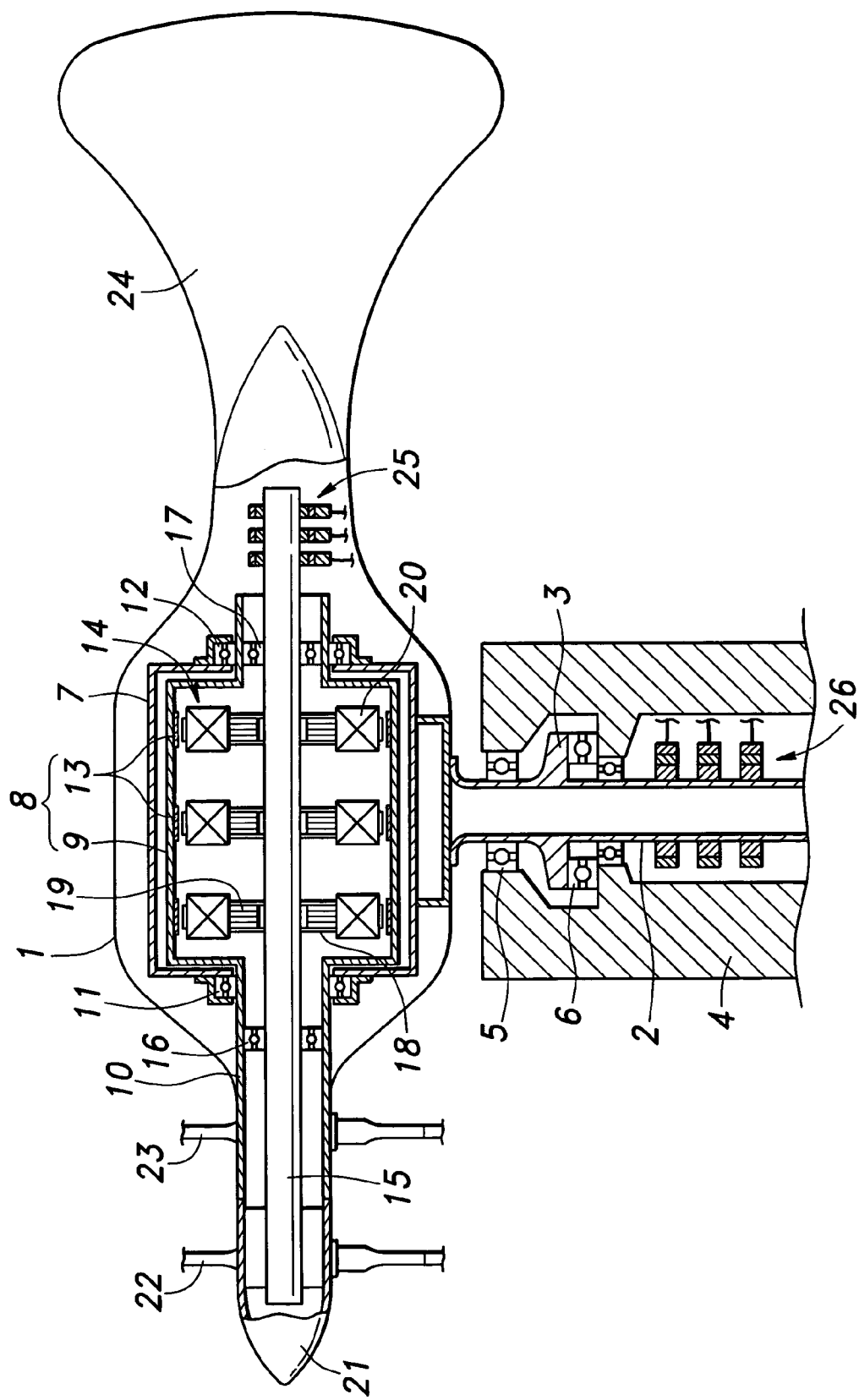
FIG. 1 is a simplified overall sectional side view of a wind power generating system embodying the present invention.
Figure 2:
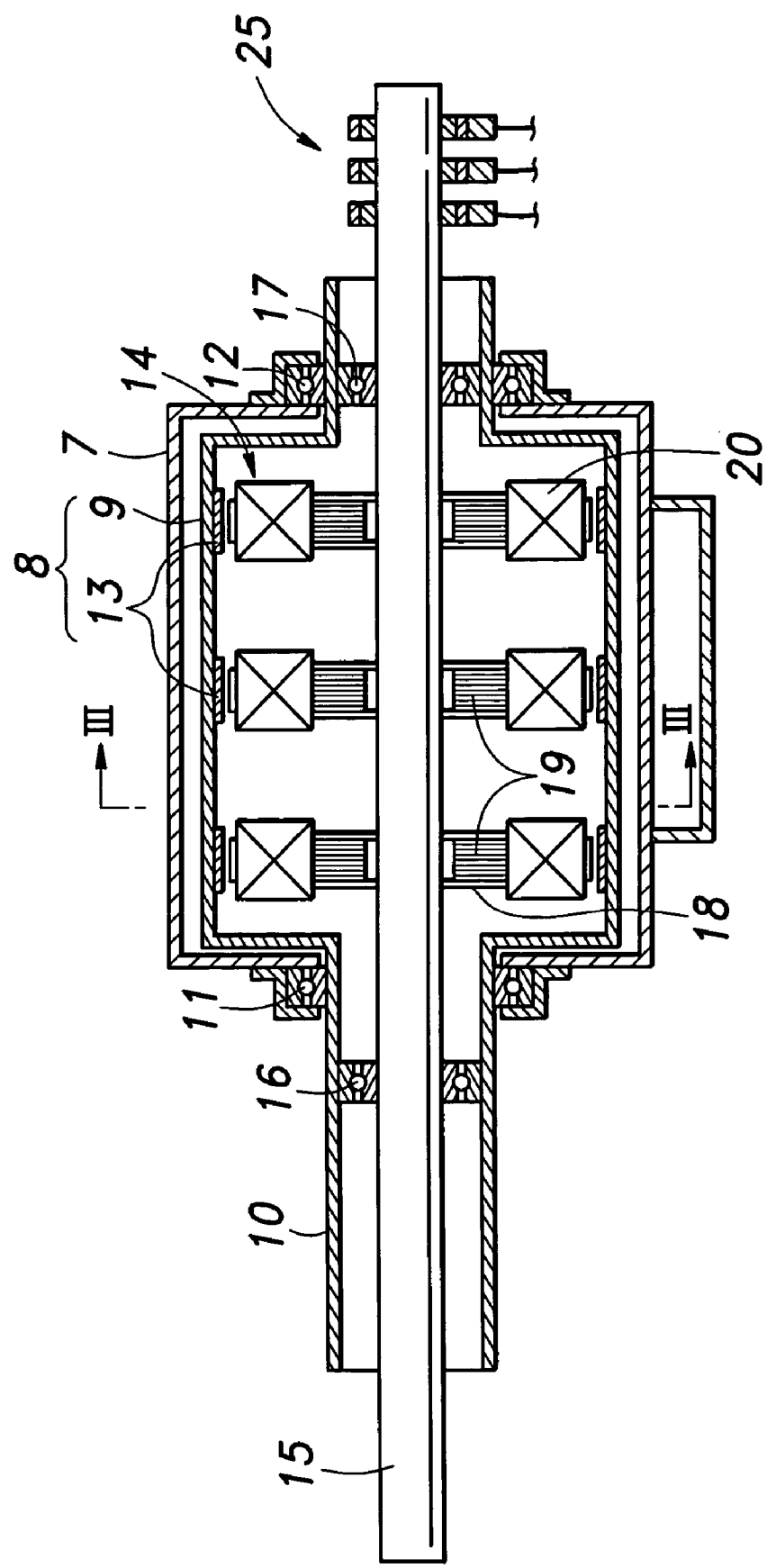
FIG. 2 is a sectional side view of the generator used in the system shown in FIG. 1.
Figure 3:
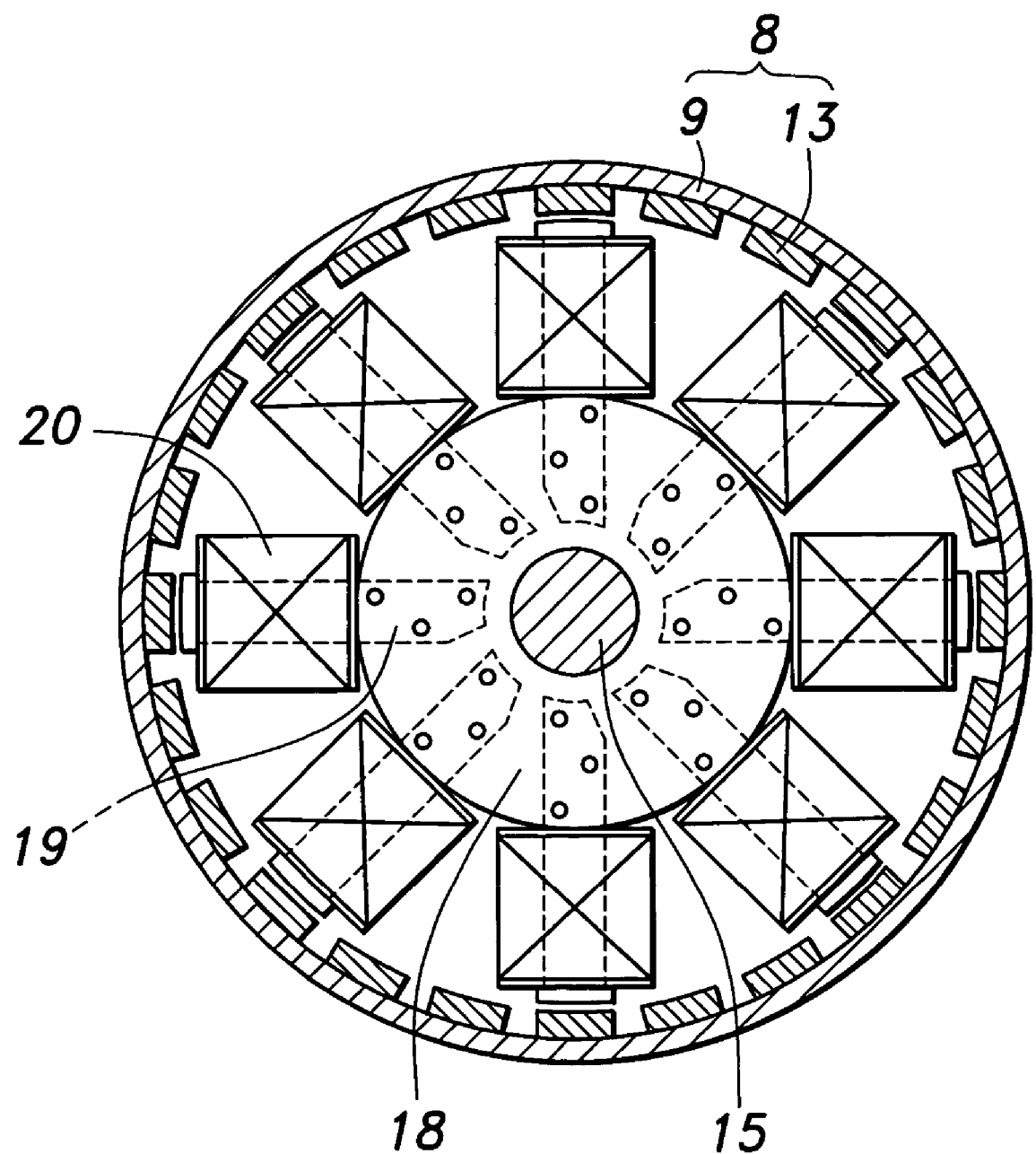
FIG. 3 is a cross sectional view taken along line III—III of FIG. 2.
Figure 4:
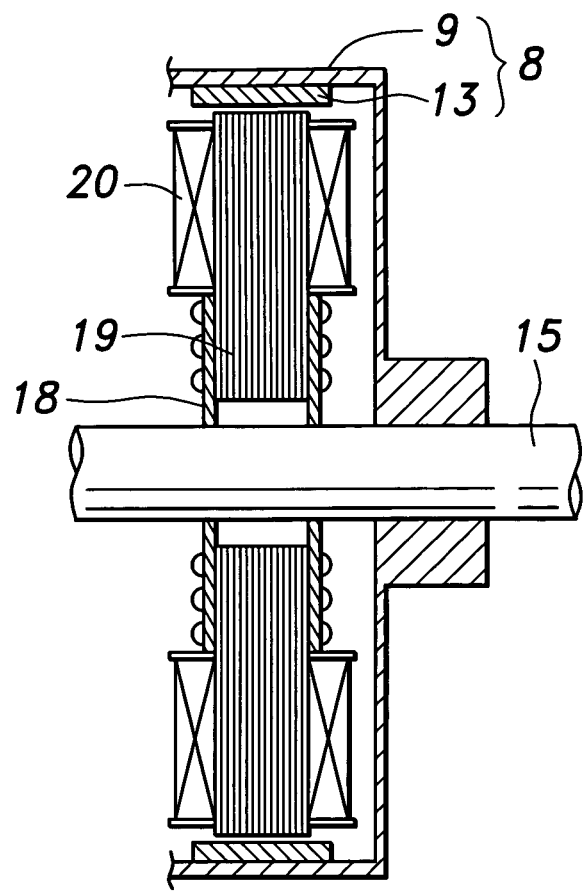
FIG. 4 is a fragmentary sectional side view of the inner and outer rotors.
Figure 5:
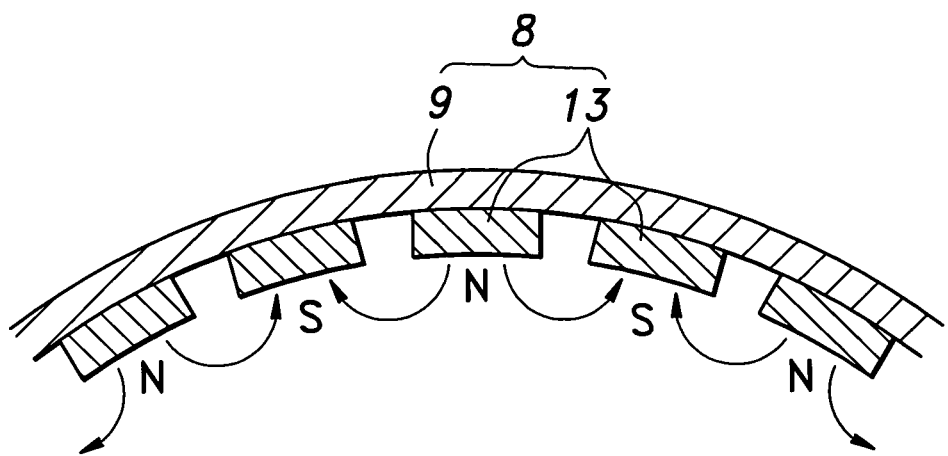
FIG. 5 is a fragmentary cross sectional side view of the outer rotor.

FIG. 1 shows a wind power generating system (or windmill electric generator system) embodying the present invention. An aerodynamically shaped housing 1 is provided with a support shaft 2 that depends vertically downward from the housing along a line passing through the gravitational center of the system. The support shaft 2, is provided with a radial flange 3. The support shaft 2 is rotatably supported by a fixed base 4 via a radial bearing 5 and a thrust bearing 6.

A generally cylindrical inner housing 7 is fixedly secured in the generator housing 1. A generally cylindrical outer rotor 8 is rotatably supported by the inner housing 7 via a front bearing 11 and a rear bearing 12. The outer rotor 8 is provided with a hollow cylindrical member 9, and a front extension 10 which is disposed coaxially with the cylindrical member 9 and reduced in diameter from the cylindrical member 9. A plurality of permanent magnets 13 are attached to the inner circumferential surface of the cylindrical member 9. In this embodiment, the permanent magnets 13 are arranged along three rows each extending circumferentially and regularly spaced in the axial direction.

An inner rotor 14 is coaxially received in the outer rotor 8. The inner rotor 14 comprises a central shaft 15 which is rotatably supported by the outer rotor 8 via a front bearing 16 and a rear being 17. The inner rotor 14 further comprises three sets of core teeth 19, each set consisting of a plurality of core teeth 19 extending radially at a regular angular interval which are securely attached to the shaft 15 by a pair of disks 18 interposing the core teeth 19 between them and fixedly secured thereto by rivets or threaded bolts. The three core teeth sets are axially spaced from each other so as to correspond to the three rows of the permanent magnets 13. Each core tooth is provided with a coil 20 fitted thereon.

A first turbine 22 is fixedly attached to the front end of the shaft 15 via an aerodynamically shaped nose cone 21. The rear edge of the nose cone 21 substantially aligns with the front edge of the coaxial extension 10 and the nose cone 21 and coaxial extension 10 jointly define an aerodynamically smooth outer surface. A second turbine 23 is fixedly attached to the coaxial extension 10. The first turbine 22 consists of three turbine blades each provided with a certain pitch angle, and the second turbine 23 similarly consists of three turbine blades each provided with a same pitch angle as that of the turbine blades of the first turbine 22 but of an opposite sense. In other words, when the pitch angle of the turbine blades of the first turbine 22 is $+\alpha$, the pitch angle of the turbine blades of the second turbine 23 is $-\alpha$.

A tail fin 24 is attached to the rear end of the generator housing 1 to orient the wind power generator system toward the wind. Between the end of the shaft 15 remote from the free end (provided with the first turbine 22) and the opposing part of the generator housing 1 is provided with a slip ring arrangement 25 for forwarding the output of the power generator to an external circuit not shown in the drawing in cooperation with another slip ring arrangement 26 provided between the support shaft 2 and the opposing part of the fixed base 4.

The two turbines 22 and 23 may be provided with a pitch varying mechanism so that the wind generator may be adapted to the prevailing wind speed by varying the pitch angle of each turbine blade. However, according to the present invention, because the generator is capable of producing a relatively large power even at a low wind speed, it is possible to do away with a pitch varying mechanism and reduce the manufacturing cost of the wind power generating system.

FIGS. 2 to 5 show the poly-phase synchronous generator used in the illustrated embodiment. The cylindrical member 9 is made of magnetic material such as iron, and the permanent magnets 13 are attached to the inner circumferential surface of the cylindrical member 9 by suitable means. The N and S poles of each permanent magnet 13 are located on the radially inner and outer ends thereof, and the permanent magnets 13 are arranged such that the radially inner ends are provided with S and N poles in an alternating fashion along the circumferential direction.

Each core tooth 19 is provided with a radially elongated rectangular shape, and is commonly interposed between a pair of disk members 18 at the base end thereof. Threaded bolts or rivets are passed through the disk members 18 and the base end of each core tooth 19 to thereby integrally join the core teeth 19 with the central shaft 15.

In the illustrated embodiment, the outer rotor 8 comprises 24 permanent magnets 13 along each circumferential row at a regular angular interval while the inner rotor 14 is provided with eight core teeth 19 along each circumferential row. Because the first and second turbines 22 and 23 are provided with turbine blades that are opposite in sense, the inner and outer rotor rotate at a same rotational speed in opposite directions. Therefore, to produce an AC output of 50 Hz, it is necessary for each of the inner and outer rotors to rotate at N rpm where N=120

$$50 \text{ (Hz)} \times 60 \text{ (sec)} = N \times 24 \times 2$$

$$\text{or } N = (50 \times 60)/(24 \times 2) = 62.5$$

In other words, if the inner rotor and outer rotor each rotate at a speed of 62.5 rpm or approximately one revolution per second, a power output of the required frequency can be obtained. If desired, the power output may be suitably converted into a DC power or an AC power of a constant frequency without regard to the rotational speed of the inner and outer rotors by using a suitable power control circuit.

According to the present invention, because the inner and outer rotors rotate at a same speed but in opposite directions, the induction coils pass through the magnetic flux produced by the permanent magnets at twice the speed of the inner rotor or outer rotor. Therefore, even when the wind speed is low and the turbines rotate at a relatively low speed, the generator can produce a power output of a desired magnitude or a desired frequency. This enables the power generator of the present invention to produce a required level of power output even from highly low wind speed levels.

If the first turbine and second turbine are arranged one next to the other at a close proximity, the turbulence caused by the first turbine adversely affects the operation of the second turbine, and this seriously reduces the efficiency of the second turbine. According to the research conducted by the inventors, it was discovered that when the axial spacing between the first and second turbines is five times the axial width of the turbine blades, the interference by the first turbine on the second turbine can be kept minimal. However, it is desirable to minimize the axial length of the wind power generating system. In such a case, this spacing may be reduced to about three times the axial width of the turbine blades, and a practically acceptable efficiency can be ensured.

If the turbines are each provided with variable pitch blades using a pitch varying mechanism, it is possible to optimize the aerodynamic efficiency of the turbine over a wide range of wind speed, but the pitch varying mechanism is relatively expensive because of the need for a highly complex mechanism and an associated control arrangement, and this causes an increase in the manufacturing cost. The present invention can be implemented without requiring such a pitch varying mechanism, and can be manufactured and maintained at a significantly low cost. It was also found that the spacing between the first and second turbines should be at least 10% of the outer diameter of the turbines in order to minimize interferences between the two turbines and ensure a favorable efficiency.

Although the present invention has been described in terms of a preferred embodiment thereof, it is obvious to a person skilled in the art that various alterations and modifications are possible without departing from the scope of the present invention which is set forth in the appended claims.

What is claimed is:

1. A wind power generating system, comprising:
   a generator housing mounted on a fixed base so as to be rotatable around a vertical axis;
   an outer rotor including a hollow cylindrical member supported by the generator housing so as to be rotatable around a horizontal axis and a plurality of permanent magnets attached to an inner circumferential surface of the cylindrical member at a regular angular interval, the cylindrical member including a coaxial extension having a reduced diameter;

an inner rotor including a shaft disposed coaxially with the cylindrical member in a freely rotatable manner, a plurality of core teeth arranged circumferentially along an outer circumferential surface of the shaft, and a coil wound around each core tooth, the shaft including a free end that coaxally extends out of the coaxial extension of the cylindrical member;

a slip ring arrangement for electrically connecting the coils of the inner rotor to an external circuit;

a first turbine including a plurality of turbine blades mounted to the free end of the shaft of the inner rotor;

a second turbine including a plurality of turbine blades mounted on the coaxial extension of the cylindrical member, the turbine blades of the second turbine being provided with a pitch angle that is opposite in sense from those of the first turbine but otherwise similar in shape as those of the first turbine;

wherein the first turbine is axially spaced from the second turbine at least by three times the axial width of the turbine blades.

2. A wind power generating system according to claim 1, wherein the turbine blades of the first and second turbines are each provided with a fixed pitch angle.

3. A wind power generating system according to claim 1, wherein the first turbine is axially spaced from the second turbine at least by five times the axial width of the turbine blades.

4. A wind power generating system according to claim 1, wherein the number of the permanent magnets is n times the number of the core teeth, n being an integer equal to two or greater.

5. A wind power generating system according to claim 1, wherein the slip ring arrangement is provided between an end of the shaft of the inner rotor remote from the free end thereof extending out of the cylindrical member of the outer rotor and an opposing part of the generator housing.

6. A wind power generating system according to claim 1, wherein the inner rotor includes three sets of core teeth that are arranged along an axial direction, and the outer rotor includes three sets of permanent magnets arranged along an axial direction so as to correspond with the three sets of core teeth.

7. A wind power generating system according to claim 1, wherein the first turbine is axially spaced from the second turbine at least by 10% of the diameter of the turbines.

* * * * *